UNITED STATES PATENT OFFICE.

ISAAC ADAMS, JR., OF BOSTON, MASSACHUSETTS.

IMPROVEMENT IN COATING METALLIC ARTICLES WITH VULCANIZABLE RUBBER.

Specification forming part of Letters Patent No. 215,034, dated May 6, 1879; application filed September 5, 1878.

*To all whom it may concern:*

Be it known that I, ISAAC ADAMS, Jr., of Boston, in the State of Massachusetts, have invented a new and useful Improvement in Covering Metals with Vulcanized Rubber, of which the following is a specification.

Great difficulty has been experienced in making rubber adhere securely to metals; but by my improvement a firm adhesion may be obtained.

The invention consists in interposing between the metallic article and the rubber a film of any metal which, at the temperature of vulcanization, has a considerable tendency to unite with the sulphur always contained in the rubber compounds. Of metals possessing such tendency the films of which may be interposed, the most suitable are copper and silver, and of these copper is the easiest as well as the cheapest to apply. Lead and zinc may likewise be used; but there is a greater difficulty in obtaining a suitable deposit of these metals for the interposing film.

The metallic article is first covered with the film selected, and the rubber compound is then applied in the usual way and vulcanized.

The easiest and best method for producing a film of metal upon the article to be covered with rubber is by electroplating, or, in some instances, by what is known as "dipping." In covering iron, steel, or tin articles with copper, the method of dipping is preferable. A weak solution of sulphate of copper is made—say two or three ounces of the crystallized salt to the gallon; and this solution may be acidulated with sulphuric acid—say about half a gill of strong acid to the gallon. The film should be very thin, and therefore the article should be immersed in the solution only a sufficient length of time to produce a bright copper-colored deposit. If allowed to remain too long the copper may not adhere to the metal beneath, and the pellicle may be too thick to produce a good adhesion between the metal and the rubber.

When electroplating is adopted as the method for producing the film, great care should be taken that the film adheres to the metal underneath it, and likewise that too thick a film be not deposited. An adherent film such as is known as "coloring" or "striking" is amply sufficient.

Since it is necessary that the interposed film be very thin, it follows that in certain cases, as of covering other metal articles not mentioned above, the film must not be of the same metal as the metallic article immediately beneath. Such film—for instance, a film of copper—cannot successfully be interposed between rubber and a copper article, or an article containing much copper in its composition; but the difficulty in such cases is overcome by first coating the article with tin, nickel, iron, or other suitable metal foreign to the thin film hereinbefore referred to as the "interposed film," and then proceeding as if the article to be united with the rubber had originally been wholly of iron, nickel, tin, or other suitable metal.

Whenever it can readily be done, the rubber should be applied to metallic articles coated with a thin film, as aforesaid, and vulcanized in molds, or subjected to pressure during the process of vulcanization.

I claim—

1. The process of covering metallic articles with rubber, by first coating the said metallic articles with a thin film of copper or other metal which readily unites with sulphur, and then applying the rubber and submitting it to vulcanization, substantially as described.

2. The process of applying rubber to articles of metal having a strong affinity for sulphur, by first coating such metallic articles with a metal not readily uniting with sulphur, and then applying a thin film of copper or other metal which does readily unite with sulphur, and finally applying the rubber and submitting it to vulcanization, substantially as described.

ISAAC ADAMS, JR.

Witnesses:
WILLIAM W. SWAN,
JOHN W. ROSE.